June 1, 1954          H. R. GOULD          2,680,219
CLAMP AND MOUNTING ASSEMBLY FOR REACTOR TYPE BALLAST
Filed May 16, 1952
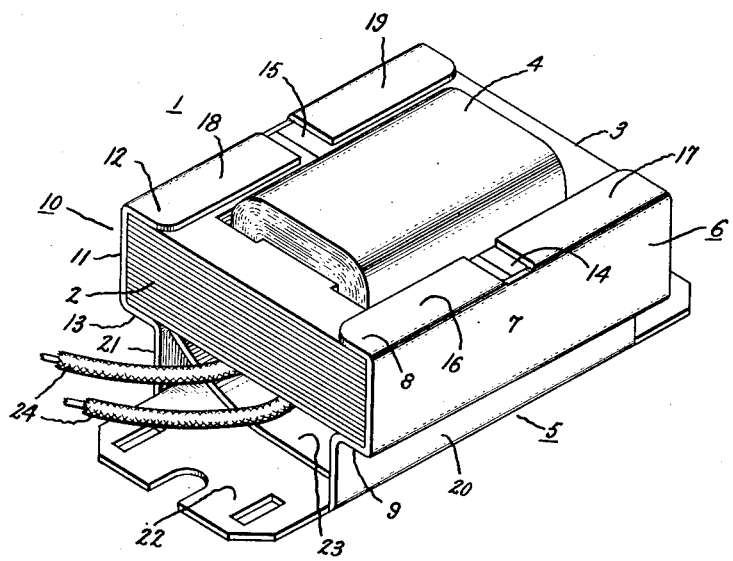
Inventor:
Herbert R. Gould,
by Powell P. Mack
His Attorney.

Patented June 1, 1954

2,680,219

UNITED STATES PATENT OFFICE 2,680,219

CLAMP AND MOUNTING ASSEMBLY FOR REACTOR TYPE BALLAST

Herbert R. Gould, Fort Wayne, Ind., assignor to General Electric Company, a corporation of New York Application May 16, 1952, Serial No. 288,237

10 Claims. (Cl. 317—228)

This invention relates to a clamp and mounting arrangement for a magnetic core and coil assembly and more particularly to a combined clamp and mounting bracket arrangement for a fluorescent lamp ballast comprising an electrical coil mounted on a magnetic core.

It is an object of this invention to provide a new and improved unitary clamping and mounting bracket arrangement for a magnetic core and coil structure of the shell type comprising stacks of laminations on which a preformed electrical coil is positioned.

It is a further object of this invention to provide a combined core clamp and mounting bracket arrangement for a magnetic core and coil assembly, having a core clamp portion which will securely clamp the core laminations tightly together in such manner as to prevent vibration and joint noise, with the mounting bracket portion being arranged in such manner as to protect the electrical coil and the leads of the coil.

It is a still further object of this invention to provide a core clamp arrangement which is economical to manufacture and which easily lends itself to automatic or semi-automatic assembly methods.

It is a further object of this invention to provide a new and improved clamping and mounting arrangement for a fluorescent lamp ballast comprising two stacks of E-shaped laminations butt jointed end to end to form a closed magnetic circuit having a center leg and a pair of outer core legs, with a preformed electrical coil being positioned on the center core leg.

In accordance with these objectives, this invention provides a new and improved clamping and mounting bracket arrangement for a magnetic core and coil assembly in accordance with which the combined clamp and bracket member is provided with a pair of oppositely-disposed channel-shaped clamping elements which respectively clamp oppositely-disposed outer legs of the core, with the mounting bracket portion being positioned between the two oppositely-disposed clamping elements and lying in a plane substantially parallel to the plane of the magnetic core laminations but displaced from the plane of the laminations by a distance sufficient to accommodate the electrical coil positioned on the center leg of the core.

The features of this invention which I believe to be novel are set forth with particularity in the appended claims. My invention itself, however, both as to its organization and use, together with further objects and advantages thereof, may best be understood by reference to the following description taken in connection with the accompanying drawing which shows a view of a magnetic core and coil assembly, in this case a fluorescent lamp ballast, incorporating the features of my invention.

Referring now to the drawing, there is shown a core and coil assembly 1 comprising a pair of stacks 2 and 3, respectively, of E-shaped laminations. The respective stacks 2 and 3 are butted to each other to form a closed magnetic circuit comprising a pair of outer core legs and a center core leg. The back portions of the E-shaped laminations form the yoke portions of the core, and the leg portions of the E-shaped laminations form the legs of the core. All of the laminations lying in a given stack are similar to all of the other laminations lying in the same stack, with the corresponding legs of all E-shaped laminations in the same stack being of the same length. The center legs of the respective laminations may be made shorter than the outer legs to provide an air gap at the center leg for control of the reactance of the core and coil if desired. Due to the fact that corresponding legs of the superposed laminations lying in the respective stacks are all the same length, the butt joints between the respective leg members lying in each layer of a given core leg all lie on the same line transverse of that core leg. A preformed electrical coil 4 is positioned on the center leg of the core before the respective stacks 2 and 3 are placed in abutting relation to close the core.

To hold the stacks of laminations 2 and 3 and the coil 4 tightly in assembled relation, and also to provide a suitable mounting means for the core and coil assembly, I provide a combination core clamp and mounting means which is generally designated as 5 and which may be made of one integral piece of metal. The member 5 is provided with a pair of channel-shaped clamping elements 6 and 7 which respectively grip the two outer legs of the magnetic core structure. The channel-shaped clamping element 6 is provided with a web or main body portion 7, with flange portions 8 and 9 disposed perpendicularly to the respective opposite ends of web 7. The oppositely-disposed channel-shaped clamping element 10 has a web portion 11 and flange portions 12 and 13 respectively disposed at the upper and lower ends of the web. The distance between the flanges 8 and 9 of clamping element 6 and between flanges 12 and 13 of clamping element 10 are such that the outer legs of lamination stacks 2 and 3 are held tightly in compression in such manner as to reduce vibration of the core laminations and to prevent joint noise.

Flanges 8 and 12 of the clamping elements 6 and 10, respectively, are respectively provided with slots 14 and 15 in the region where the butt joints between lamination stacks 2 and 3 occur. The respective slots 14 and 15 extend from the outer edge of the respective flanges 8 and 12 inwardly for a distance substantially equal to the width of the respective flanges, the width of the flanges, in turn, corresponding substantially to the width of the outer legs of the core stacks 2 and 3. The flange 8 of clamping element 6 is thereby divided into portions 16 and 17 by the slot 14, while the flange 12 of clamping element 10 is divided into portions 18 and 19 by slot 15. The use of slot 14 permits portions 16 and 17 to be bent over independently of each other, and similarly, the use of slot 15 permits portions 18 and 19 to be bent over independently of each other. The advantage of this arrangement is that if the respective lamination stacks 2 and 3 are not of exactly the same height, the respective portions 16, 17, 18 and 19 may be clamped into the necessary relation for the particular height of the lamination stacks to which they are related independently of the height of the oppositely-disposed stack of laminations.

The combination clamp and mounting arrangement is provided with a pair of oppositely-disposed portions 20 and 21 which are integral with and perpendicular to the lower flanges 9 and 13, respectively, and extend below the bottom surface of the magnetic core, with respect to the drawing, for a distance which is slightly greater than the distance which the coil 4 projects below the magnetic core. Portions 20 and 21 are integral with the channel-shaped clamping elements 6 and 10 and if the clamping and mounting assembly 5 is made of a single piece of metal, the flanges 9 and 13 are bent substantially perpendicularly to the respective portions 20 and 21. The ends of the respective portions 20 and 21 are joined together by a base portion 22 which lies in a plane substantially parallel to the plane of the laminations. A suitable piece of insulation, such as fiber insulation 23, may be positioned between coil 4 and the inner surface of base portion 22. The base portion 22 serves as a base for mounting the ballast structure and for this purpose the base portion is made longer than the core and its outer ends are suitably apertured for the reception of mounting hardware. The space between the inner surface of base 22 and the bottom surface of the laminations of stacks 2 and 3 serves as a receptacle for the portion of coil 4 which projects below the surface of the magnetic core, with respect to the view shown in the drawing. Also, the chamber formed between the inner surface of base member 22 and the bottom surface of the laminations of stacks 2 and 3 serves to protect the leads 24 to coil 4.

A further advantage of the combination core clamp and mounting base hereinbefore described is that the clamp portion holds the core laminations in tightly assembled relation during the manufacturing operation. Thus, after the laminations have been clamped, the core and coil may be subjected to a varnish treatment and the clamp will maintain the core and coils in tightly assembled relation while the varnish is being cured. Also, if the clamp is used for a reactor type ballast having a center leg air gap, with cement being applied at the gap, the clamp maintains a fixed spacing at the gap until the cement hardens.

The combination core clamp and mounting bracket hereinbefore described has the further advantage that it easily lends itself to automatic or semi-automatic assembly methods, since it may be formed of a single piece of metal which may be bent to the required configuration.

It can be seen that I have provided a new and improved combination core clamp and mounting base for a magnetic core and coil assembly which permits individual clamping of each of the stacks of laminations in accordance with the height of the stacks, and also provides an integral base portion by means of which the coil and core assembly may be mounted on any suitable surface, with a chamber being provided between the mounting base and the magnetic core which serves to protect the coil and leads.

While there has been shown and described a particular embodiment of my invention, it will be obvious to those skilled in the art that various changes and modifications can be made without departing from the invention, and, therefore, it is aimed in the appended claims to cover all such changes and modifications as fall within the true spirit and scope of the invention.

What I claim as new and desire to secure by Letters Patent in the United States is:

1. In combination, a magnetic core and coil assembly comprising two stacks of E-shaped laminations butt jointed together to form a closed magnetic circuit, each of the legs of each of said stacks of E-shaped laminations being respectively aligned with a leg of the other stack to form a magnetic core having two outer leg members and a center leg member, a preformed electrical coil positioned on said center leg member, substantially all the leg portions of the E-shaped laminations lying in said outer leg members of said core being butt jointed in the same plane transverse of said respective outer leg members of said core, a clamping and mounting arrangement for said core and coil comprising a pair of oppositely-disposed channel-shaped clamping elements, each of said clamping elements extending for substantially the entire length of said outer leg members of said core and engaging and clamping said respective outer leg members, each of said channel-shaped clamping elements having a web member substantially perpendicular to the plane of said laminations and lying closely adjacent the outer edges of said outer leg members and a pair of flange members disposed at opposite ends of said web member and substantially parallel to the plane of said laminations, one of said flange members of each of said channel-shaped clamping elements having a slotted portion in the region overlying said butt joints in the respective outer leg members of said core, said slotted portion extending from the outer edge of said one flange member for a distance substantially equal to the width of said one flange member to permit individual clamping of said stacks of laminations, and a mounting element for said core and coil integral with said channel-shaped clamping elements, said mounting element comprising a base portion lying in a plane substantially parallel to the plane of said laminations, said base portion extending for at least the length of said core and being spaced from the plane of said laminations a distance sufficient to accommodate the portion of said coil which projects beyond the plane of said laminations, said base portion being connected to said clamping elements by a pair of oppositely-disposed side members lying in a plane substantially perpendicular to the plane of said laminations, said side portions being integrally attached to the innermost portion of the respective flange members closest to the respective side portions.

2. In combination, a magnetic core and coil assembly comprising two stacks of E-shaped laminations butt jointed together to form a closed magnetic circuit, each of the legs of each said stacks of E-shaped laminations being respectively aligned with a leg of the other stack to form a magnetic core having two outer leg members and a center leg member, a preformed electrical coil positioned on said center leg member, substantially all the leg portions of the E-shaped laminations lying in said outer leg members of said core being butt jointed in the same plane transverse of said respective leg members of said core, a clamping and mounting arrangement for said core and coil comprising a pair of oppositely-disposed channel-shaped clamping elements, each of said clamping elements extending for substantially the entire length of said outer leg members of said core and engaging and clamping said respective outer leg members, each of said channel-shaped clamping elements having a web member and a pair of flange members disposed at opposite ends of said web member and substantially perpendicular thereto, said web member being disposed substantially perpendicularly to the plane of said laminations, said flange member being disposed substantially parallel to the plane of said laminations, the oppositely-disposed flange members of the respective channel-shaped clamping elements being spaced at such distance from each other as to hold said laminations tightly in compression, one of said flange members of each of said channel-shaped clamping elements having a slotted portion in the region overlying said butt joints between said stacks of E-shaped laminations, said slotted portion extending from the outer edge of said one flange member for a distance substantially equal to the width of said one flange member to permit individual clamping of said stacks of laminations and a mounting element for said core and coil integral with said channel-shaped clamping elements, said mounting element comprising a base portion lying in a plane substantially parallel to the plane of said laminations, said base portion extending for at least the length of said core and being spaced from the plane of said laminations a distance sufficient to accommodate the portion of said coil which projects beyond the plane of said laminations, said base portion being connected to said clamping elements by a pair of oppositely-disposed side members lying in a plane substantially perpendicular to the plane of said laminations, said side portions being integrally attached to the innermost portion of the respective flange members closest to the respective side portions.

3. In combination with a magnetic core and coil assembly of the shell type, said magnetic core being formed of a plurality of superposed laminations of flat stacked magnetic material, said magnetic core having a center leg member with an electrical coil positioned thereon, and a pair of outer leg members respectively disposed on opposite sides of said center leg member and serving as magnetic flux return paths between the ends of said center core leg, a core clamping and mounting bracket for said magnetic core and coil comprising a pair of oppositely-disposed channel-shaped clamping elements, each of said clamping elements extending for substantially the entire length of said outer leg members of said core and engaging and clamping said respective outer leg members, each of said clamping elements having a web member substantially perpendicular to the plane of said laminations and lying closely adjacent the outer edges of said outer leg members and a pair of flange members disposed at opposite ends of said web member and substantially parallel to the plane of said laminations, one of said flange members of each of said clamping elements having a slotted portion intermediate of its length, said slotted portion extending from the outer edge of said one flange member for a distance substantially equal to the width of said one flange member to permit individual clamping of the laminations on either side of said slotted portion, and a mounting element for said core and coil integral with said channel-shaped clamping elements, said mounting element comprising a base portion lying in a plane substantially parallel to the plane of said laminations, said base portion extending for at least the length of said core and being spaced from the plane of said laminations a distance sufficient to accommodate the portion of said coil which projects beyond the plane of said laminations, said base portion being connected to said clamping elements by a pair of oppositely-disposed side members lying in a plane substantially perpendicular to the plane of said laminations, said side members being integrally attached to the innermost portion of the respective flange members closest to the respective side members.

4. A clamping and mounting arrangement for a magnetic core and coil assembly of the type having a center core leg on which said coil is mounted and a pair of oppositely-disposed outer core legs, said core being formed of flat stacked laminated magnetic material, said clamping and mounting arrangement comprising a pair of oppositely-disposed channel-shaped clamping elements for clamping said oppositely-disposed core legs, each of said channel-shaped clamping elements having a web member and a pair of flange members disposed at opposite ends of said web member and substantially perpendicular thereto, the oppositely-disposed flange members of the respective channel-shaped clamping elements being spaced at such distance from each other as to hold the laminations of said core tightly in compression, one of said flange members of each of said clamping elements having a slotted portion intermediate of its length, said slotted portion extending from the outer edge of said one flange member to permit individual clamping of the laminations longitudinally disposed on either side of said slotted portion, and a mounting element for said core and coil integral with said channel-shaped clamping elements, said mounting element comprising a base portion lying in a plane substantially parallel to the plane of said laminations, said base portion extending for at least the length of said core and being spaced from the plane of said laminations a distance sufficient to accommodate the portion of said coil which projects beyond the plane of said laminations, said base portion being connected to said clamping elements by a pair of oppositely-disposed side members lying in a plane substantially perpendicular to the plane of said laminations, said side portions being integrally attached to the innermost portion of the respective flange members closest to the respective side portions.

5. In combination with a magnetic core and coil assembly of the shell type, said magnetic core being formed of a plurality of superposed laminations of flat stacked magnetic material, said magnetic core having a center leg member with an electrical coil positioned thereon, and a pair of outer leg members respectively disposed on opposite sides of said center leg member and serving as magnetic flux return paths between the ends of said center core leg, a core clamp and mounting bracket for said magnetic core and coil comprising a pair of oppositely-disposed channel-shaped clamping elements, each of said clamping elements extending for substantially the entire length of said outer leg members of said core and engaging and clamping said respective outer leg members, each of said clamping elements having a web member substantially perpendicular to the plane of said laminations and lying closely adjacent the outer edges of said outer leg members and a pair of flange members disposed at opposite ends of said web member and substantially parallel to the plane of said laminations, and a mounting element for said core and coil integral with said channel-shaped clamping elements, said mounting element comprising a base portion lying in a plane substantially parallel to the plane of said laminations, said base portion extending for at least the length of said core and being spaced from the plane of said laminations a distance sufficient to accommodate the portion of said coil which projects beyond the plane of said laminations, said base portion being connected to said clamping elements by a pair of oppositely-disposed side members lying in a plane substantially perpendicular to the plane of said laminations, said side members being integrally attached to the innermost portion of the respective flange members closest to the respective side members.

6. A clamping and mounting arrangement for a magnetic core and coil assembly of the type having a center core leg on which said coil is mounted and a pair of oppositely-disposed outer core legs, said core being formed of flat stacked laminated magnetic material, said clamping and mounting arrangement comprising a pair of oppositely-disposed channel-shaped clamping elements for clamping said oppositely-disposed core legs, each of said channel-shaped clamping elements having a web member and a pair of flange members disposed at opposite ends of said web member and substantially perpendicular thereto, the oppositely-disposed flange members of the respective channel-shaped clamping elements being spaced at such distance from each other as to hold the laminations of said core tightly in compression, and a mounting element for said core and coil integral with said channel-shaped clamping elements, said mounting element comprising a base portion lying in a plane substantially parallel to the plane of said laminations, said base portion extending for at least the length of said core and being spaced from the plane of said laminations a distance sufficient to accommodate the portion of said coil which projects beyond the plane of said laminations, said base portion being connected to said clamping elements by a pair of oppositely-disposed side members lying in a plane substantially perpendicular to the plane of said laminations, said side portions being integrally attached to the innermost portion of the respective flange members closest to the respective side portions.

7. A clamping and mounting arrangement for a magnetic core and coil assembly of the type having a center core leg on which said coil is mounted and a pair of oppositely-disposed outer legs, said core being formed of flat stacked laminated material, said clamping and mounting arrangement comprising a pair of oppositely-disposed channel-shaped clamping elements for clamping said oppositely-disposed core legs, each of said channel-shaped clamping elements having a web member and a pair of flange members disposed at opposite ends of said web member and substantially perpendicularly thereto, the oppositely-disposed flange members of the respective channel-shaped clamping elements being spaced at such distance from each other as to hold the laminations of said core tightly in compression, and a mounting element for said core and coil integral with said channel-shaped clamping elements, said mounting element comprising a base portion lying in a plane substantially parallel to the plane of said laminations, said base portion extending for the entire length of said core, with a mounting foot being attached to each of the respective opposite ends of said base portion, said base portion being spaced from the plane of said laminations a distance sufficient to accommodate the portion of said coil which projects beyond the plane of said laminations, said base portion being connected to said clamping elements by a pair of oppositely-disposed side members lying in a plane substantially perpendicular to the plane of said laminations, said side members being integrally attached to the innermost portion of the respective flange members closest to the respective side members.

8. In combination with a magnetic core and coil assembly of the shell type, said magnetic core being formed of a plurality of superposed laminations of flat stacked magnetic material, said magnetic core having a center leg member with an electrical coil positioned thereon, and a pair of outer leg members respectively disposed on opposite sides of said center leg member and serving as magnetic flux return paths between the ends of said center core leg, a core clamp and mounting bracket for said magnetic core and coil comprising a pair of oppositely-disposed channel-shaped clamping elements, each of said clamping elements extending for substantially the entire length of said outer leg members of said core and engaging and clamping said respective outer leg members, each of said clamping elements having a web member substantially perpendicular to the plane of said laminations and lying closely adjacent the outer edges of said outer leg members and a pair of flange members disposed at opposite ends of said web member and substantially parallel to the plane of said laminations, and a mounting element for said core and coil integral with said channel-shaped clamping elements, said mounting element comprising a base portion lying in a plane substantially parallel to the plane of said laminations, said base portion extending for the entire length of said core and being spaced from the plane of said laminations a distance sufficient to accommodate the portion of said coil which projects beyond the plane of said laminations, a separate mounting foot attached to each of the respective opposite ends of said base portion, said base portion being connected to said clamping elements by a pair of oppositely-disposed side members lying in a plane substantially perpendicular to the plane of said laminations, said side members being integrally attached to the innermost portion of the respective flange members closest to the respective side members.

9. A clamping and mounting arrangement for a magnetic core and coil assembly of the type having a center core leg on which said coil is mounted and a pair of oppositely disposed outer core legs, said coil having electrical leads thereto, said core being formed of flat stacked laminated magnetic material, said clamping and mounting arrangement comprising a pair of oppositely disposed channel-shaped clamping elements for clamping said outer core legs to compress said laminations, a base portion substantially parallel to said laminations and spaced therefrom to accommodate said coil and said leads, and means integral with said channel shaped elements and with said base portion interconnecting said elements and said base portion.

10. A clamping and mounting arrangement for a magnetic core and coil assembly of the type having a center core leg on which said coil is mounted and a pair of oppositely disposed outer core legs, said core being formed of flat stacked laminated magnetic material, said clamping and mounting arrangement being formed of a single piece of sheet metal and comprising a pair of oppositely disposed channel-shaped clamping elements for clamping said outer core legs to compress said laminations, said arrangement further comprising a base portion substantially parallel to said laminations and spaced therefrom to accommodate said coil, and further comprising means interconnecting said channel-shaped elements and said base portion.

References Cited in the file of this patent

UNITED STATES PATENTS

| Number    | Name        | Date          |
|-----------|-------------|---------------|
| 1,537,386 | Tingley     | May 12, 1925  |
| 1,651,713 | Karas       | Dec. 7, 1927  |
| 2,156,461 | Rittenhouse | May 2, 1939   |
| 2,413,897 | Wilson      | Jan. 7, 1947  |